US009040156B2

(12) United States Patent
Hong et al.

(10) Patent No.: US 9,040,156 B2
(45) Date of Patent: May 26, 2015

(54) WHITLOCKITE AND METHOD FOR MANUFACTURING THE SAME

(71) Applicant: SNU R&DB FOUNDATION, Seoul (KR)

(72) Inventors: Kug Sun Hong, Seoul (KR); Ki Tae Nam, Seoul (KR); Hae Lin Jang, Seongnam-si (KR); Hyun Seung Ryu, Yongin-si (KR); Kyoung Suk Jin, Bucheon-si (KR)

(73) Assignee: SNU R&DB FOUNDATION (KR)

( * ) Notice: Subject to any disclaimer, the term of this patent is extended or adjusted under 35 U.S.C. 154(b) by 247 days.

(21) Appl. No.: 13/645,508

(22) Filed: Oct. 4, 2012

(65) Prior Publication Data

US 2014/0044966 A1    Feb. 13, 2014

(30) Foreign Application Priority Data

Aug. 10, 2012   (KR) .................. 10-2012-0087613

(51) Int. Cl.
*C09K 3/00* (2006.01)
*C01B 25/32* (2006.01)

(52) U.S. Cl.
CPC ........... *C01B 25/32* (2013.01); *Y10T 428/2982* (2015.01); *C01B 25/322* (2013.01); *Y10S 977/773* (2013.01)

(58) Field of Classification Search
USPC .......... 428/402; 252/182.35, 182.33; 977/773
IPC .. C01B 25/32,25/322; C09K 3/00; B82Y 30/00
See application file for complete search history.

(56) References Cited

U.S. PATENT DOCUMENTS

2012/0087954 A1    4/2012   Xia et al.

FOREIGN PATENT DOCUMENTS

| JP | 09-175806 | 7/1997 |
| KR | 1020010106090 A | 11/2001 |
| KR | 1020090092903 A | 9/2009 |

OTHER PUBLICATIONS

Correia et al: "Wet synthesis and characterization of modified hydroxyapatite powders" JOMS vol. 7, No. 8, Aug. 1996, pp. 501-505.*
Gopal et al: "Crystal structure of synthetic Mg-whitlockite" Canadian Jurnal of Chaistry Canada, vol. 52, No. 7, Apr. 1974, pp. 1155-1164.*
Extended European Search Report for 12190849.5 mailed Nov. 28, 2013.
Correia R N et al: "Wet synthesis and characterization of modified hydroxyapatite powders", Journal of Materials Science: Materials in Medicine Aug. 1996 Chapman & Hall Ltd GB, vol. 7, No. 8, pp. 501-505, XP002716399.
Gopal R et al: "Crystal structure of synthetic Mg-whitlockite, Ca18Mg2H2(P04)14", Canadian Journal of Chemistry Canada, vol. 52, No. 7, Apr. 1, 1974, pp. 1155-1164, XP002716415, ISSN: 0008-4042.
Abbona F et al: "Crystallization of calcium and magnesium phosphates from solutions of low concentration", Journal of Crystal Growth, Elsevier, Amsterdam, NL, vol. 104, No. 3, Aug. 1, 1990, pp. 661-671, XP024429997, ISSN: 0022-0248, 001: 10.1 016/0022-0248(90)90009-A [retrieved on Aug. 8, 1990].
Jarcho M et al: "Synthesis and Fabrication of Beta-Tricalcium Phosphate (Whitlockite) Ceramics for Potential Prosthetic Applications",Journal of Materials Science, Kluwer Academic Publishers, Dordrecht, vol. 14, No. 1, Jan. 1, 1979, pp. 142-150, XP008033115,ISSN: 0022-2461, DOI: 10.1007/BF01028337.
Bow J-S et al: "Structural characterization of room-temperature synthesized nano-sized beta-tricalcium phosphate", Biomaterials, Elsevier Science Publishers BV., Barking, GB, vol. 25, No. 16, Jul. 1, 2004, pp. 3155-3161, XP004490247, ISSN: 0142-9612,DOI: 10.1 016/J.Biomaterials.2003.10.046.
Database CA [Online], Chemical Abstracts Service, Columbus, Ohio, US; Sep. 16, 1997, Toda Yoshitomo et al.: "Preparation of nonstochiometric whitlockite by liquid phase reaction", XP002716519,Database accession No. 127:165696; & JP9175806A (Sangi Co., Ltd., Japan) Dec. 25, 1995.
Lagier et al., "Magnesium Whitlockite, a Calcium Phosphate Crystal of Special Interest in Pathology," Pathol. Research and Practice, 2003, vol. 199, pp. 329-335.

* cited by examiner

*Primary Examiner* — Leszek Kiliman

(57) ABSTRACT

This invention relates to whitlockite and a method for manufacturing the same. The method includes adding, to water, a calcium ion supplying material and a cation supplying material containing a cation (X) other than the calcium ion to prepare a cation aqueous solution, adding a phosphoric acid supplying material to the cation aqueous solution, and aging the cation aqueous solution including the phosphoric acid supplying material. As a result, whitlockite having high purity and high crystallinity can be mass produced using a simple process.

20 Claims, 7 Drawing Sheets

WHITLOCKITE AND METHOD FOR MANUFACTURING THE SAME

BACKGROUND

1. Technical Field

The present disclosure relates to whitlockite and a method for manufacturing the same.

2. Description of the Related Art

Currently, calcium phosphate based compounds are being widely utilized as biocompatible inorganic materials. The calcium phosphate based compounds have been applied in a variety of fields, including dispersants, stabilizers and so on for producing artificial bones, dental restorative materials, bone cement, oral compositions, drugs, tablets, cosmetics, food and resins.

Typical examples of calcium phosphate based compounds include hydroxyapatite (HAP: $Ca_{10}(PO_4)_6(OH)_2$) and β-tricalcium phosphate (TCP: $Ca_3(PO_4)_2$). HAP which is artificially synthesized has superior biocompatibility as well as chemical properties which are almost the same as those of bone, but has very large crystallinity and thus does not decompose in vivo, undesirably making it impossible to be used as a substitute for natural bone. On the other hand, β-TCP decomposes in vivo and induces the growth of natural bone, and thus thorough research into monophasic β-TCP or BCP (biphasic calcium phosphate) which is a mixture of β-TCP and HAP is ongoing. However, it is difficult to synthesize nano-sized β-TCP in a large amount using conventional techniques, and thereby limitations are imposed on applying β-TCP in a variety of fields.

With the goal of solving the problems, whitlockite obtained by substituting a portion of a calcium ion of β-TCP with a different cation is under study in recent years. However, conventional methods for manufacturing whitlockite are problematic because of the complicated manufacturing processes, high manufacturing costs, and the generation of byproducts such as HAP and the like, making it difficult to form highly pure whitlockite.

SUMMARY

In one embodiment, the present disclosure provides a method for manufacturing whitlockite using a simple manufacturing process.

According to some embodiments, the present disclosure also concerns a method for manufacturing whitlockite, which enables nano-sized whitlockite to be mass produced.

According to some embodiments, the present disclosure also provides a method for manufacturing whitlockite, which may suppress the generation of byproducts, yielding highly pure whitlockite.

In addition, the present disclosure provides whitlockite manufactured using the above method.

According to some embodiments, the present disclosure provides a method for manufacturing whitlockite, comprising adding, to water, a calcium ion supplying material and a cation supplying material containing a cation (X) other than the calcium ion to prepare a cation aqueous solution, adding a phosphoric acid supplying material to the cation aqueous solution, and aging the cation aqueous solution including the phosphoric acid.

In the cation aqueous solution, the cation (X) may be contained in an amount of 10~50 mol % based on the total amount of cations (Ca+X).

The phosphoric acid supplying material may be added to bring a molar ratio of anion to cation (anion/cation=P/(Ca+X)) to 0.6 or greater.

The amount of the cation (X) and the molar ratio of anion to cation may be selected within a range that suppresses formation of a byproduct other than the whitlockite in view of the correlation therebetween.

The calcium ion supplying material may include one or more chosen from calcium hydroxide, calcium acetate, calcium carbonate, and calcium nitrate.

The cation (X) may include one or more chosen from Mg, Co, Sb, Fe, Mn, Y, Eu, Cd, Nd, Na, La, Sr, Pb, Ba and K.

The cation supplying material may include one or more chosen from a hydroxide compound (X-hydroxide), an acetate compound (X-acetate), a carbonate compound (X-carbonate), and a nitrate compound (X-nitrate).

The phosphoric acid supplying material may include one or more chosen from diammonium hydrogen phosphate, ammonium phosphate, and phosphoric acid.

The phosphoric acid supplying material may be added in a dropwise manner.

The pH of the cation aqueous solution may be gradually decreased depending on the addition of the phosphoric acid supplying material, and the cation aqueous solution including the phosphoric acid supplying material added thereto may be aged in an acidic environment.

The cation supplying material may be magnesium hydroxide, the amount of magnesium (Mg) in the cation aqueous solution may be 10~35 mol % based on the total amount of cations (Ca+Mg), and the phosphoric acid supplying material may be added to bring the molar ratio of anion to cation (anion/cation=P/(Ca+Mg)) to 0.8 or greater.

The cation supplying material may be magnesium nitrate, and the phosphoric acid supplying material may be added to bring the molar ratio of anion to cation (anion/cation=P/(Ca+Mg)) to 0.6 or greater.

The above method may further comprise adding an oxidant to the water or the cation aqueous solution before adding the phosphoric acid supplying material. The oxidant may be hydrogen peroxide.

The above method may further comprise drying the aged aqueous solution thus forming whitlockite powder.

The temperature of the water may be equal to or lower than a boiling point.

In addition, the present invention provides whitlockite manufactured using the above method.

As such, the whitlockite may have a chemical formula represented by $Ca_{20-y}X_y(HPO_4)_2(PO_4)_{12}$, and a ratio of Ca:X:P may be (1.28±0.2):(0.14±0.02):1.

The whitlockite may have a particle size of 100 nm or less.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of embodiments of the present invention. The present invention is not limited to these embodiments and may be embodied in the other forms. The embodiments of the present invention are provided so that thorough and complete contents are ensured and the spirit of the invention is sufficiently transferred to a person having ordinary knowledge in the art.

<Method for Manufacturing Whitlockite>

Figure 1:
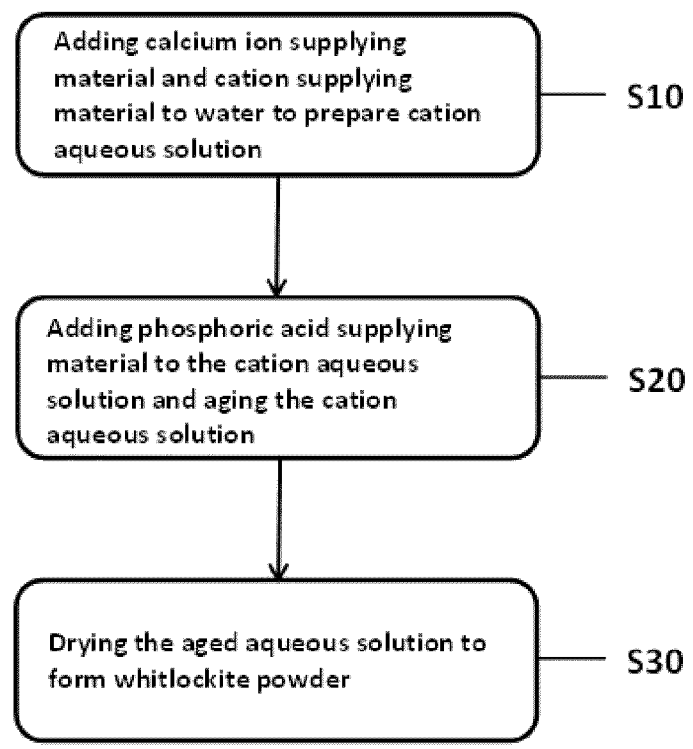
FIG. 1 schematically illustrates a process for manufacturing whitlockite according to an embodiment of the present invention.

FIG. 1 schematically illustrates a process for manufacturing whitlockite according to an embodiment of the present invention.

As illustrated in FIG. 1, the method for manufacturing whitlockite may include adding a calcium ion supplying material and a cation supplying material to water to prepare a cation aqueous solution at step S10, adding a phosphoric acid supplying material to the cation aqueous solution, aging the cation aqueous solution including the phosphoric acid supplying material at step S20, and drying the aged aqueous solution to form whitlockite powder at step S30.

Specifically, the calcium ion supplying material and the cation supplying material containing a cation (X) other than a calcium ion are added to water to prepare the cation aqueous solution at step S10.

As such, the temperature of water may be equal to or lower than the boiling point, for example, 20~100° C.

The calcium ion supplying material may include one or more chosen from calcium hydroxide, calcium acetate, calcium carbonate, and calcium nitrate.

The cation (X) may have an ionic radius similar to that of the calcium ion. The cation (X) may include one or more chosen from Mg, Co, Sb, Fe, Mn, Y, Eu, Cd, Nd, Na, La, Sr, Pb, Ba and K. The cation supplying material may include one or more chosen from a hydroxide compound (X-hydroxide), an acetate compound (X-acetate), a carbonate compound (X-carbonate), and a nitrate compound (X-nitrate).

The amount of the cation (X) in the cation aqueous solution may be 10~50 mol % based on the total amount of cations (Ca+X). The amount of the cation (X) contained in the final product, that is, whitlockite, is about 10 mol % based on the total amount of the calcium ion and the cation (X) contained in whitlockite. If the amount of the cation (X) in the cation aqueous solution is less than 10 mol % or is greater than 50 mol %, it is difficult to obtain very pure whitlockite.

In the case where the cation supplying material is magnesium hydroxide, the amount of magnesium (Mg) in the cation aqueous solution may be 10~35 mol % based on the total amount of cations (Ca+Mg).

The phosphoric acid supplying material is added to the cation aqueous solution, and the cation aqueous solution including the phosphoric acid supplying material is aged at step S20.

The phosphoric acid supplying material may include one or more chosen from diammonium hydrogen phosphate, ammonium phosphate, and phosphoric acid.

The phosphoric acid supplying material may be added in a dropwise manner. When the phosphoric acid supplying material is added in a dropwise manner in this way, the pH of the cation aqueous solution may be gradually decreased. The cation aqueous solution is basic before the addition of the phosphoric acid supplying material, and then the pH thereof is lowered due to the addition of the phosphoric acid supplying material and thus a final acidic environment is formed and then the cation aqueous solution may be aged. Thereby, very pure whitlockite may be obtained. In the case where an acidic environment is provided from the beginning and thus aging progresses, calcium phosphate based compounds such as dicalcium phosphate anhydride (DCPA, $CaHPO_4$) and dicalcium phosphate dehydrate (DCPD, $CaHPO_4 \cdot 2H_2O$) may be rapidly produced and may therefore remain behind. Also in the case where aging is carried out in a neutral or basic environment, the HAP phase is preferentially formed, making it difficult to synthesize very pure whitlockite. However, in the present invention, as the phosphoric acid supplying material is added in a dropwise manner to the cation aqueous solution, the synthesis proceeds in a basic environment in the early stage, and thus DCPA and DCPD phases are not formed and only the HAP phase is produced. After completion of the addition of the phosphoric acid supplying material, synthesis proceeds in an acidic environment and a whitlockite phase is formed. Also, the HAP phase formed in the basic environment is dissolved in the acidic environment and thus converted into a whitlockite phase, thereby obtaining very pure whitlockite.

The phosphoric acid supplying material may be added to bring the molar ratio of anion to cation (anion/cation=P/(Ca+X)) to 0.6 or greater. If the molar ratio of anion to cation is less than 0.6, it is difficult to make an acidic environment after addition of the phosphoric acid supplying material to the cation aqueous solution. The molar ratio of anion to cation may be appropriately set within the range that may form an acidic environment of the cation aqueous solution to which the phosphoric acid supplying material was added. Also, the molar ratio of anion to cation may be properly selected depending on the kind of phosphoric acid supplying material. For example, in the case where the cation supplying material is magnesium hydroxide, the phosphoric acid supplying material may be added to bring the molar ratio of anion to cation (anion/cation=P/(Ca+Mg)) to 0.8 or greater. In the case where the cation supplying material is magnesium nitrate, the phosphoric acid supplying material may be added to bring the molar ratio of anion to cation (anion/cation=P/(Ca+Mg)) to 0.6 or greater.

The aging time may be determined in consideration of the aging temperature and the particle size of the resulting whitlockite. For example, when the aging temperature is 80° C. and 70° C., the aging time may be 6 hr and 12 hr, respectively.

The method for manufacturing whitlockite may further include adding an oxidant to the cation aqueous solution before adding the phosphoric acid supplying material. The oxidant may be hydrogen peroxide. The addition of hydrogen peroxide may shorten the aging time. For example, when hydrogen peroxide is added, the aging time may be shortened to 30 min at an aging temperature of 80° C.

The aged aqueous solution is dried thus obtaining whitlockite powder at step S30. The whitlockite powder may be formed by subjecting the aged aqueous solution to filter pressing and then lyophilization (freeze-drying).

Figure 2:
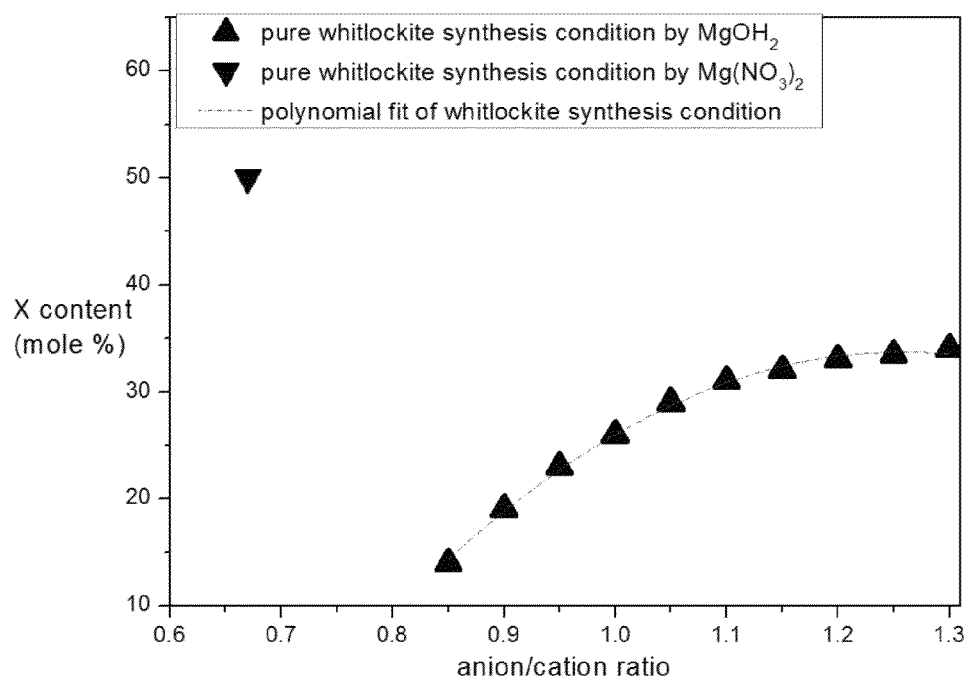
FIG. 2 illustrates the correlation between the cation content and the molar ratio of anion to cation in examples of the invention.

FIG. 2 illustrates the correlation between the cation content and the molar ratio of anion to cation in examples of the invention. As illustrated in FIG. 2, the horizontal axis indicates the molar ratio of anion to cation (anion/cation=P/(Ca+X)), and the vertical axis indicates the amount (mol %) of cation (X) based on the total amount of cations (Ca+X). In FIG. 2, in the case where the calcium ion supplying material is calcium hydroxide ($Ca(OH)_2$), the cation (X) supplying material is magnesium hydroxide ($Mg(OH)_2$) and the phosphoric acid supplying material is phosphoric acid ($H_3PO_4$) and in the case where the calcium ion supplying material is calcium nitrate ($Ca(NO_3)_2$), the cation (X) supplying material is magnesium nitrate ($Mg(NO_3)_2$) and the phosphoric acid supplying material is phosphoric acid ($H_3PO_4$), the correlation between the amount of the magnesium ion and the molar ratio of anion to cation (P/(Ca+Mg)) is depicted.

With reference to FIG. 2, the mark ▲ designates the position where very pure whitlockite is synthesized without forming byproducts other than whitlockite, for example, secondary phases such as DCPA, HAP and so on when the cation (X) supplying material is magnesium hydroxide ($Mg(OH)_2$). There is a predetermined correlation between the amount of magnesium ion (X) and the molar ratio of anion to cation for forming very pure whitlockite. For example, in the case where the amount of the magnesium ion is 23 mol % and the molar ratio of anion to cation is 0.95 and in the case where the amount of the magnesium ion is 31 mol % and the molar ratio of anion to cation is 1.1, byproducts are not formed and very pure whitlockite may be obtained. However, if the magnesium ion is excessively present at a position far away from ▲, a secondary phase such as a magnesium phosphate compound may be formed. In contrast, if the magnesium ion is deficient and thus the calcium ion is comparatively excessively present, a secondary phase such as DCPA or the like may be formed, and the amount of the resulting whitlockite may decrease.

The mark ▼ designates the position where very pure whitlockite is synthesized without forming byproducts other than whitlockite when the cation (X) supplying material is magnesium nitrate ($Mg(NO_3)_2$). That is, there is a predetermined correlation between the amount of the magnesium ion (X) and the molar ratio of anion to cation for forming very pure whitlockite. For example, in the case where the amount of the magnesium ion is 50 mol % and the molar ratio of anion to cation is 0.67, byproducts are not formed and very pure whitlockite may result.

Figure 3:
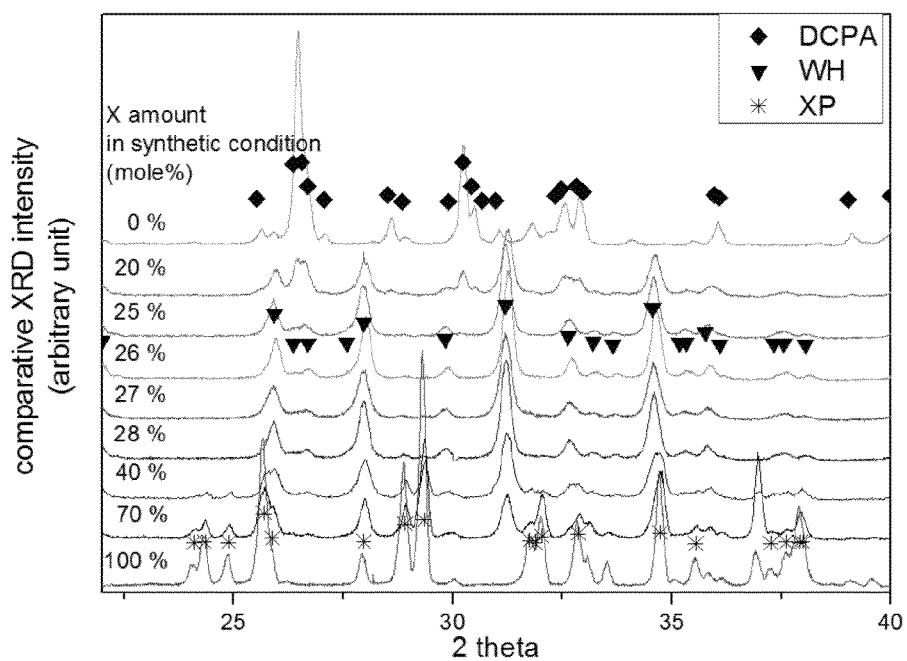
FIG. 3 illustrates an X-ray diffraction (XRD) graph of powder formed for differing amounts of cation under the condition of the molar ratio of anion to cation being fixed to 1.

FIG. 3 illustrates an XRD graph of the powder formed for differing amounts of cation under the condition of the molar ratio of anion to cation being fixed to 1. Such powder was manufactured using calcium hydroxide, magnesium hydroxide and phosphoric acid as the calcium ion supplying material, the cation (X) supplying material and the phosphoric acid supplying material, respectively.

With reference to FIG. 3, in the case where the molar ratio of anion to cation is 1, when the amount of the magnesium ion as the cation (X) is 26 mol % and the amount of the calcium ion is 74 mol %, the purest whitlockite (WH) is formed. If the amount of the magnesium ion is less than 26 mol %, DCPA is formed as a secondary phase. If the magnesium ion is not contained and the amount of the calcium ion is 100 mol %, pure DCPA is formed. In contrast, if the amount of the magnesium ion is greater than 26 mol %, magnesium phosphate (XP) is formed as a secondary phase, and if the amount of the magnesium ion is 100 mol %, pure magnesium phosphate is formed.

<Whitlockite>

Whitlockite of the invention that is manufactured using the above method has high purity and high crystallinity. This whitlockite may have a chemical formula represented by $Ca_{20-y}X_y(HPO_4)_2(PO_4)_{12}$. In this chemical formula, X may include one or more chosen from Mg, Co, Sb, Fe, Mn, Y, Eu, Cd, Nd, Na, La, Sr, Pb, Ba and K. X may have an ionic radius similar to that of the calcium ion.

When analyzing whitlockite of the examples of the invention with inductively coupled plasma (ICP), a ratio of Ca:X:P is shown to be (1.28±0.2):(0.14±0.02):1, which is very similar to 1.28:0.14:1 which is the theoretical value of whitlockite. In the above chemical formula, the ratio of Ca:X:P may be (1.28±0.2):(0.14±0.02):1. The particle size of the whitlockite may be 100 nm or less.

A better understanding of the present invention may be obtained via the following examples, which are set forth to illustrate, but are not to be construed as limiting the present invention.

EXAMPLE

Example 1

With reference to the correlation between the cation content and the molar ratio of anion to cation as illustrated in FIG. 2, the amount of the magnesium ion was set to 23 mol % based on the total amount of cations and the molar ratio of anion to cation (P/(Ca+Mg)) was set to 0.95, and aging was performed at 80° C., thus synthesizing whitlockite.

Tertiary distilled water was boiled to remove dissolved gaseous impurities, after which 0.385 mol calcium hydroxide (0.5 mol multiplied by 0.77) and 0.115 mol magnesium hydroxide (0.5 mol multiplied by 0.23) were added to the distilled water, and stirring was then performed at 80° C., thus preparing a calcium-magnesium aqueous solution.

0.475 mol phosphoric acid (0.5 mol multiplied by 0.95) was placed in a burette and then slowly added in a dropwise manner to the calcium-magnesium aqueous solution which was being stirred. After the completion of the addition of phosphoric acid to the calcium-magnesium aqueous solution, the solution was aged while being stirred at 80° C. for 6 hr, thereby synthesizing whitlockite.

The aged aqueous solution was filter pressed and lyophilized, yielding whitlockite powder.

Example 2

With reference to the correlation between the cation content and the molar ratio of anion to cation as illustrated in FIG. 2, the amount of the magnesium ion was set to 31 mol % based on the total amount of cations and the molar ratio of anion to cation (P/(Ca+Mg)) was set to 1.1, and aging was performed at 70° C., thus synthesizing whitlockite.

Tertiary distilled water was boiled to remove dissolved gaseous impurities, after which 0.345 mol calcium hydroxide (0.5 mol multiplied by 0.69) and 0.155 mol magnesium hydroxide (0.5 mol multiplied by 0.31) were added to the distilled water, and stirring was then performed at 70° C., thus preparing a calcium-magnesium aqueous solution.

0.55 mol phosphoric acid (0.5 mol multiplied by 1.1) was placed in a burette and then slowly added in a dropwise manner to the calcium-magnesium aqueous solution which was being stirred. After the completion of the addition of phosphoric acid to the calcium-magnesium aqueous solution, the solution was aged while being stirred at 70° C. for 12 hr, thereby synthesizing whitlockite.

The aged aqueous solution was filter pressed and lyophilized, yielding whitlockite powder.

Example 3

With reference to the correlation between the cation content and the molar ratio of anion to cation as shown in FIG. 2, the amount of the magnesium ion was set to 31 mol % based on the total amount of cations and the molar ratio of anion to cation (P/(Ca+Mg)) was set to 1.1, and aging was performed at 65° C., thus synthesizing whitlockite.

Tertiary distilled water was boiled to remove dissolved gaseous impurities, after which 0.345 mol calcium hydroxide (0.5 mol multiplied by 0.69) and 0.155 mol magnesium hydroxide (0.5 mol multiplied by 0.31) were added to the distilled water, and then stirring was performed at 65° C., thus preparing a calcium-magnesium aqueous solution.

0.55 mol phosphoric acid (0.5 mol multiplied by 1.1) was placed in a burette and then slowly added in a dropwise manner to the calcium-magnesium aqueous solution which was being stirred. After the completion of the addition of phosphoric acid to the calcium-magnesium aqueous solution, the solution was aged while being stirred at 65° C. for two weeks, thereby synthesizing whitlockite.

The aged aqueous solution was filter pressed and lyophilized, yielding whitlockite powder.

Example 4

With reference to the correlation between the cation content and the molar ratio of anion to cation as shown in FIG. 2, the amount of the magnesium ion was set to 23 mol % based on the total amount of cations and the molar ratio of anion to cation (P/(Ca+Mg)) was set to 0.95, and aging was performed in a hydrogen peroxide aqueous solution at 80° C., thus synthesizing whitlockite.

Tertiary distilled water was boiled to remove dissolved gaseous impurities, after which a 10% hydrogen peroxide aqueous solution was added in an amount of 30 wt % based on the total weight to the distilled water. As such, the concentration and the amount of the added hydrogen peroxide aqueous solution may be set so as to accelerate the synthesis of whitlockite to thereby shorten the aging time, and these concentration and amount are not limited to those of Example 4. 0.385 mol calcium hydroxide (0.5 mol multiplied by 0.77) and 0.115 mol magnesium hydroxide (0.5 mol multiplied by 0.23) were added to the distilled water which the hydrogen peroxide aqueous solution was added to, and then stirring was performed at 80° C., thus preparing a calcium-magnesium aqueous solution.

0.475 mol phosphoric acid (0.5 mol multiplied by 0.95) was placed in a burette and then slowly added in a dropwise manner to the calcium-magnesium aqueous solution which was being stirred. After the completion of the addition of phosphoric acid to the calcium-magnesium aqueous solution, the solution was aged while being stirred at 80° C. for 30 min, thereby synthesizing whitlockite.

The aged aqueous solution was filter pressed and lyophilized, yielding whitlockite powder.

Example 5

With reference to the correlation between the cation content and the molar ratio of anion to cation as shown in FIG. 2, the amount of the magnesium ion was set to 50 mol % based on the total amount of cations and the molar ratio of anion to cation (P/(Ca+Mg)) was set to 0.67, and aging was performed at 80° C., thus synthesizing whitlockite.

Tertiary distilled water was boiled to remove dissolved gaseous impurities, after which 0.25 mol calcium nitrate (Ca$(NO_3)_2$) (0.5 mol multiplied by 0.5) and 0.25 mol magnesium nitrate (Mg$(NO_3)_2$) (0.5 mol multiplied by 0.5) were added to the distilled water, and then stirring was performed at 80° C., thus preparing a calcium-magnesium aqueous solution.

0.335 mol phosphoric acid (0.5 mol multiplied by 0.67) was placed in a burette and then slowly added in a dropwise manner to the calcium-magnesium aqueous solution which was being stirred. After the completion of the addition of phosphoric acid to the calcium-magnesium aqueous solution, the solution was aged while being stirred at 80° C. for 9 hr, thereby synthesizing whitlockite.

The aged aqueous solution was filter pressed and lyophilized, yielding whitlockite powder.

Figure 4:
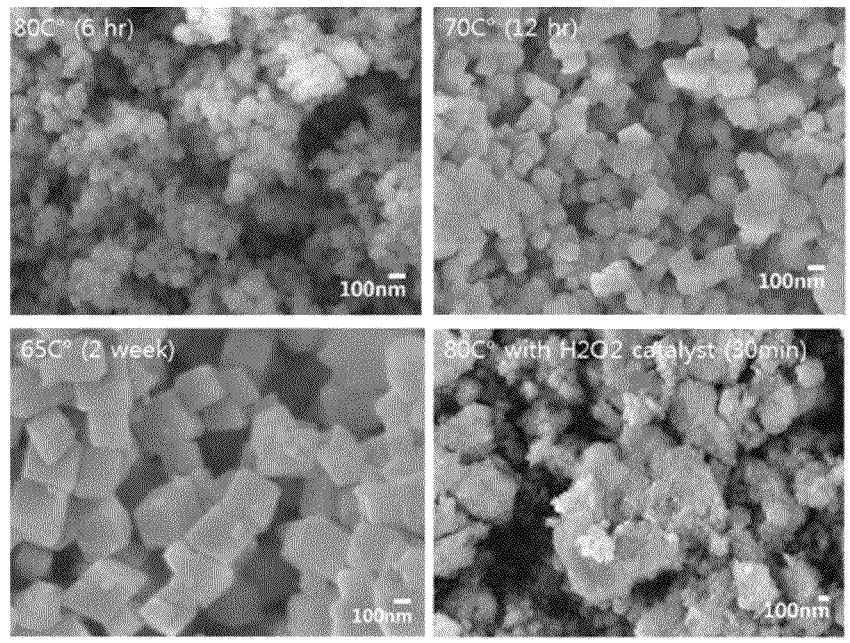
FIG. 4 illustrates field emission scanning electron microscope (FESEM) images of whitlockite powder manufactured in examples of the invention.

FIG. 4 illustrates FESEM images of whitlockite powder manufactured in the examples of the invention.

With reference to FIG. 4, four images respectively show FESEM images of whitlockite powder of Examples 1 to 4. The particle size of whitlockite powder of Examples 1 and 2 is smaller than 100 nm. The particle size of the whitlockite powder may be controlled depending on the aging conditions. Furthermore, the whitlockite powder may be obtained via aging at 80° C. for 6 hr. As such, when hydrogen peroxide is added, the aging time may be shortened to 30 min.

Figure 5:
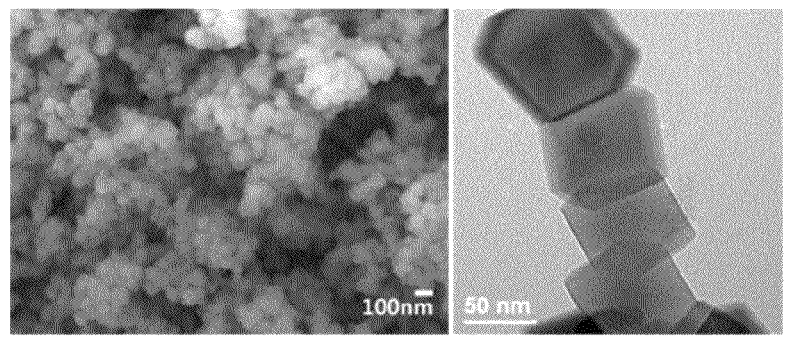
FIG. 5 illustrates an FESEM image and a transmission electron microscope (TEM) image of whitlockite powder manufactured in Example 1 of the invention.

FIG. 5 illustrates an FESEM image and a TEM image of the whitlockite powder of Example 1 of the invention.

With reference to FIG. 5, the left image shows an FESEM image, and the right image shows a TEM image. The whitlockite powder of Example 1 has a rhombohedral shape having a uniform size of about 50 nm.

Figure 6:
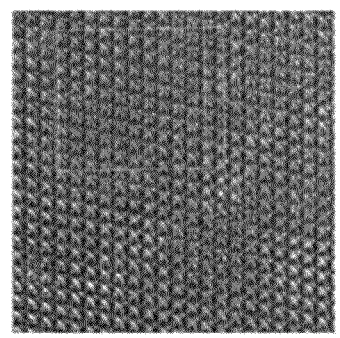
FIG. 6 illustrates a high resolution transmission electron microscope (HRTEM) image of the whitlockite powder manufactured in Example 1 of the invention.
Figure 7:
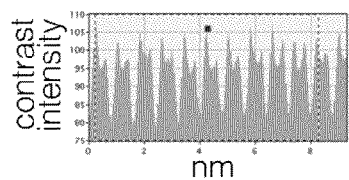
FIG. 7 illustrates a graph showing a distance between planes corresponding to the lattice spacing of the whitlockite powder of FIG. 6.

FIG. 6 is an HRTEM image of the whitlockite powder of Example 1 of the invention, and FIG. 7 is a graph showing the distance between planes corresponding to the lattice spacing of the whitlockite powder of FIG. 6.

With reference to FIGS. 6 and 7, the whitlockite powder of Example 1 can be seen to regularly have only an intrinsic distance (8.067 Å-whitlockite (012)) between planes of whitlockite as represented by JCPDS (70-2064). That is, the whitlockite powder of Example 1 can be seen to have high purity.

Figure 8:
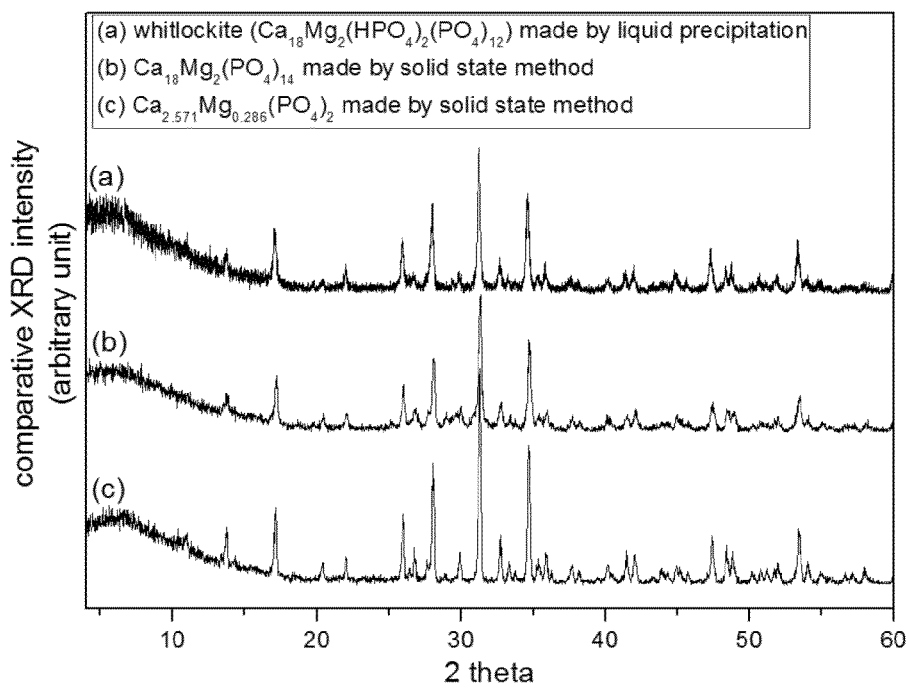
FIG. 8 illustrates an XRD graph of the whitlockite powder manufactured in Example 1 of the invention and calcium magnesium phosphate powder manufactured using a solid state process.

FIG. 8 is an XRD graph of the whitlockite powder of Example 1 of the invention and the calcium magnesium phosphate powder obtained using a solid state process. The graph (a) is an XRD graph of the whitlockite powder of Example 1, and the graph (b) is an XRD graph of calcium magnesium phosphate powder obtained via heat treatment at 1100° C. using a solid state process in which the ratio of Ca:Mg:P is the same as that of the whitlockite powder of Example 1. The graph (c) is an XRD graph of calcium magnesium phosphate powder obtained via heat treatment at 1100° C. using a solid state process in which the ratio of (Ca+Mg):P is 3:2 (which is the same as the ratio of Ca:P of TCP) and which has the same ratio of Ca:Mg as that of the whitlockite powder of Example 1.

With reference to FIG. 8, the whitlockite powder of Example 1 manufactured using liquid precipitation shows the XRD peak in the same form as in the powder synthesized using a solid state process. Because the powder synthesized using a solid state process shows only the peaks of rhombohedral crystals of whitlockite and TCP on XRD without a secondary phase, the whitlockite powder of Example 1 can be confirmed to be pure whitlockite powder having no secondary phase.

Figure 9:
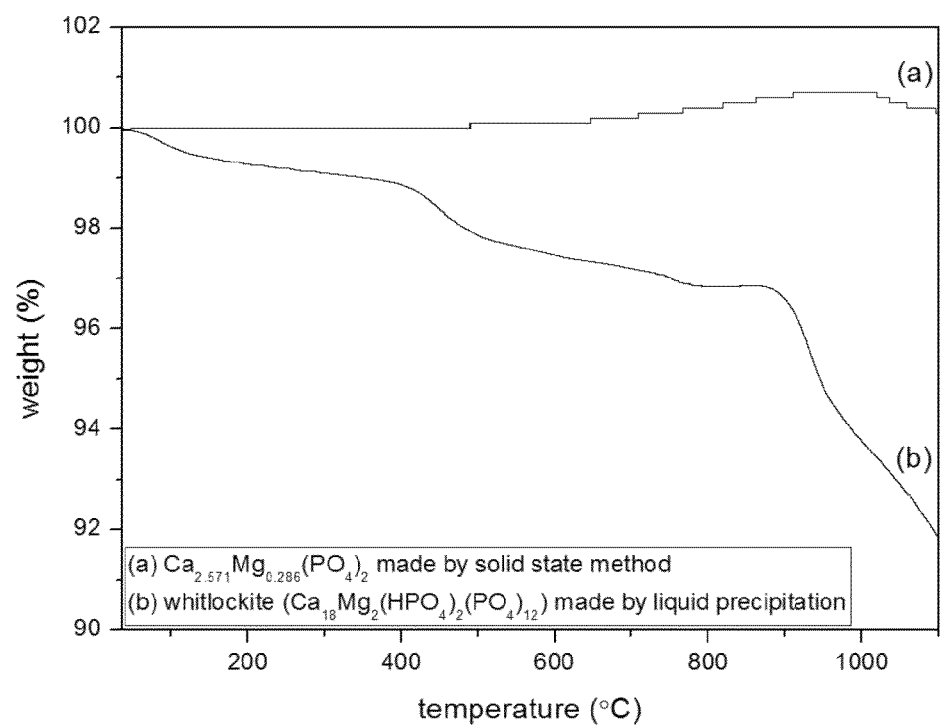
FIG. 9 illustrates a thermal gravimetric analysis (TGA) graph of the whitlockite powder manufactured in Example 1 of the invention and the calcium magnesium phosphate powder manufactured using a solid state process.

FIG. 9 is a TGA graph of the whitlockite powder of Example 1 of the invention and the calcium magnesium phosphate powder obtained using a solid state process. The graph (a) shows the weight of powder measured at a heating rate of 10° C./min, the powder being calcium magnesium phosphate powder obtained via heat treatment at 1100° C. using a solid state process in which the ratio of (Ca+Mg):P is 3:2 (which is the same as the ratio of Ca:P of TCP) and which has the same ratio of Ca:Mg as that of the whitlockite powder of Example 1. The graph (b) shows the weight of the whitlockite powder of Example 1 measured at a heating rate of 10° C./min.

With reference to FIG. 9, as the temperature is increased, the weight of the calcium magnesium phosphate powder manufactured using a solid state process is almost uniform, whereas the weight of the whitlockite powder of Example 1 is remarkably decreased. Because the whitlockite powder of Example 1 contains hydrogen, its weight is decreased due to dehydration in proportion to the increase in temperature, but the calcium magnesium phosphate powder manufactured using a solid state process has no hydrogen and thus its weight does not change even when the temperature is increased.

Figure 10:
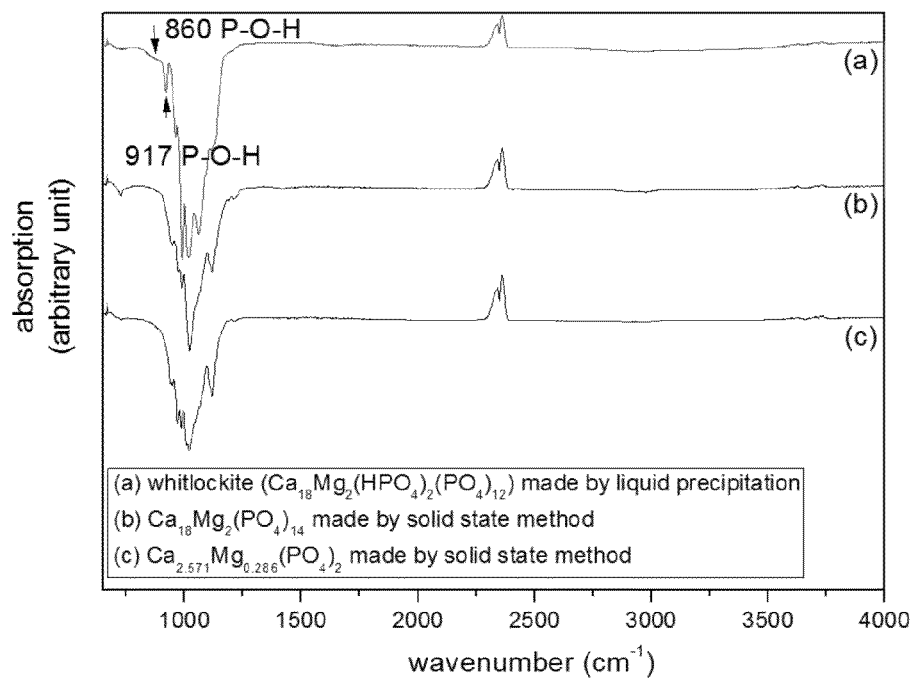
FIG. 10 illustrates a Fourier transform infrared (FT-IR) graph of the whitlockite powder manufactured in Example 1 of the invention and the calcium magnesium phosphate powder manufactured using a solid state process.

FIG. 10 is an FT-IR graph of the whitlockite powder of Example 1 of the invention and the calcium magnesium phosphate powder manufactured using a solid state process. In FIG. 10, the horizontal axis indicates a wave number and the vertical axis indicates a relative absorbance. The graph (a) is an FT-IR graph of the whitlockite powder of Example 1 and the graph (b) is an FT-IR graph of the calcium magnesium phosphate powder obtained via heat treatment at 1100° C. using a solid state process in which the ratio of Ca:Mg:P is the same as that of the whitlockite powder of Example 1. The graph (c) is an FT-IR graph of the calcium magnesium phosphate powder obtained via heat treatment at 1100° C. using a solid state process in which the ratio of (Ca+Mg):P is 3:2 (which is the same as the ratio of Ca:P of TCP) and which has the same ratio of Ca:Mg as that of the whitlockite powder of Example 1.

With reference to FIG. 10, the composition and bonding structure of the whitlockite powder of Example 1 are comparatively similar to those of the calcium magnesium phosphate powder manufactured using a solid state process, but this whitlockite powder may have an $HPO_4$ bonding structure, unlike the calcium magnesium phosphate powder manufactured via heat treatment at high temperature using a solid state process. As shown in FIG. 10, the whitlockite powder of Example 1 can be seen to have a P—O—H bond.

As described hereinbefore, the present invention provides whitlockite and a method for manufacturing the same. According to the present invention, whitlockite can be simply manufactured without performing heat treatment at high temperature and washing to remove additional ions. The manufacturing process can be simplified and thus the manufacturing cost can be reduced. Also, nano-sized whitlockite powder having high purity can be mass produced. In lieu of HAP and β-TCP, such whitlockite can be applied even to any field in which HAP and β-TCP have been utilized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing whitlockite, the method comprising:
adding, to water, a calcium ion supplying material and a cation supplying material containing a cation (X) other than a calcium ion to prepare a cation aqueous solution;
adding a phosphoric acid supplying material to the cation aqueous solution; and
aging the cation aqueous solution including the phosphoric acid supplying material,
wherein a temperature of the water is equal to or lower than a boiling point,
wherein the phosphoric acid supplying material is added in a dropwise manner,
wherein a pH of the cation aqueous solution is gradually decreased depending on addition of the phosphoric acid supplying material, and the cation aqueous solution including the phosphoric acid supplying material added thereto is aged in an acidic environment.

2. The method of claim 1, wherein, in the cation aqueous solution, the cation (X) is contained in an amount of 10~50 mol % based on a total amount of cations (Ca+X).

3. The method of claim 2, wherein the phosphoric acid supplying material is added to bring a molar ratio of anion to cation (anion/cation=P/(Ca+X)) to 0.6 or greater.

4. The method of claim 3, wherein an amount of the cation (X) and the molar ratio of anion to cation are selected within a range that suppresses formation of a byproduct other than the whitlockite in view of a correlation therebetween.

5. The method of claim 1, wherein the calcium ion supplying material includes one or more chosen from calcium hydroxide, calcium acetate, calcium carbonate, and calcium nitrate.

6. The method of claim 1, wherein the cation (X) includes one or more chosen from Mg, Co, Sb, Fe, Mn, Y, Eu, Cd, Nd, Na, La, Sr, Pb, Ba and K.

7. The method of claim 1, wherein the cation supplying material includes one or more chosen from a hydroxide compound (X-hydroxide), an acetate compound (X-acetate), a carbonate compound (X-carbonate), and a nitrate compound (X-nitrate).

8. The method of claim 1, wherein the phosphoric acid supplying material includes one or more chosen from diammonium hydrogen phosphate, ammonium phosphate, and phosphoric acid.

9. The method of claim 1, wherein the phosphoric acid supplying material is added in a dropwise manner.

10. The method of claim 9, wherein a pH of the cation aqueous solution is gradually decreased depending on addition of the phosphoric acid supplying material, and
the cation aqueous solution including the phosphoric acid supplying material added thereto is aged in an acidic environment.

11. The method of claim 1, wherein the cation supplying material is magnesium hydroxide,
an amount of magnesium (Mg) in the cation aqueous solution is 10~35 mol % based on the total amount of cations (Ca+Mg), and
the phosphoric acid supplying material is added to bring the molar ratio of anion to cation (anion/cation=P/(Ca+Mg)) to 0.8 or greater.

12. The method of claim 1, wherein the cation supplying material is magnesium nitrate, and
the phosphoric acid supplying material is added to bring the molar ratio of anion to cation (anion/cation=P/(Ca+Mg)) to 0.6 or greater.

13. The method of claim 1, further comprising adding an oxidant to the water or the cation aqueous solution before adding the phosphoric acid supplying material.

14. The method of claim 13, wherein the oxidant is hydrogen peroxide.

15. The method of claim 1, further comprising drying the aged aqueous solution thus forming whitlockite powder.

16. The method of claim 1, wherein a temperature of the water is equal to or lower than a boiling point.

17. A whitlockite, wherein the whitlockite is manufactured by a manufacturing method comprising:
adding, to water, a calcium ion supplying material and a cation supplying material containing a cation (X) other than a calcium ion to prepare a cation aqueous solution;
adding a phosphoric acid supplying material to the cation aqueous solution; and
aging the cation aqueous solution including the phosphoric acid supplying material,
wherein a temperature of the water is equal to or lower than a boiling point,
wherein the phosphoric acid supplying material is added in a dropwise manner,
wherein a pH of the cation aqueous solution is gradually decreased depending on addition of the phosphoric acid supplying material, and the cation aqueous solution including the phosphoric acid supplying material added thereto is aged in an acidic environment.

18. The whitlockite of claim 17, wherein the whitlockite has a chemical formula represented by $Ca_{20-y}X_y(HPO_4)_2(PO_4)_{12}$, and a ratio of Ca:X:P is $(1.28\pm0.2):(0.14\pm0.02):1$.

19. The whitlockite of claim 17, wherein the manufacturing method further comprises drying the aged aqueous solution thus forming whitlockite powder.

20. The whitlockite of claim 19, wherein the whitlockite powder has a particle size of 100 nm or less.

* * * * *